US008170759B2

(12) United States Patent
Jess et al.

(10) Patent No.: US 8,170,759 B2
(45) Date of Patent: May 1, 2012

(54) CHASSIS SYSTEM ENGINE TORQUE REQUESTS

(75) Inventors: Richard B. Jess, Haslett, MI (US); Mark T. Hutchinson, Oak Park, MI (US); Joseph M. Stempnik, Warren, MI (US); Michael L. Kociba, Hartland, MI (US); Mark H. Costin, Bloomfield Township, MI (US); Paul A. Bauerle, Fenton, MI (US); Michael J. Pitsch, Ann Arbor, MI (US)

(73) Assignee: GM Global Technology Operations LLC

( * ) Notice: Subject to any disclaimer, the term of this patent is extended or adjusted under 35 U.S.C. 154(b) by 634 days.

(21) Appl. No.: 12/357,740

(22) Filed: Jan. 22, 2009

(65) Prior Publication Data

US 2009/0228178 A1 Sep. 10, 2009

Related U.S. Application Data

(60) Provisional application No. 61/034,620, filed on Mar. 7, 2008.

(51) Int. Cl.
*B60W 10/10* (2006.01)

(52) U.S. Cl. .......................................... 701/54; 701/62

(58) Field of Classification Search .................... 701/54, 701/62; 73/117.01; 180/124.1, 124.109
See application file for complete search history.

(56) References Cited

U.S. PATENT DOCUMENTS

| | | | | |
|---|---|---|---|---|
| 5,103,694 | A * | 4/1992 | Kobayashi et al. | 477/162 |
| 5,492,192 | A * | 2/1996 | Brooks et al. | 180/165 |
| 2009/0287378 | A1 * | 11/2009 | Jess et al. | 701/48 |
| 2010/0025131 | A1 * | 2/2010 | Gloceri et al. | 180/65.28 |

* cited by examiner

*Primary Examiner* — Yonel Beaulieu

(57) ABSTRACT

An engine control system of a vehicle comprises a torque module and a chassis request evaluation module. The torque module controls a torque output of an engine based on a driver torque request and selectively increases the torque output based on a chassis torque request. The chassis request evaluation module selectively prevents the increase of the torque output based on at least one of a vehicle speed, a transmission state, and an accelerator pedal position.

28 Claims, 5 Drawing Sheets

CHASSIS SYSTEM ENGINE TORQUE REQUESTS

CROSS-REFERENCE TO RELATED APPLICATIONS

This application claims the benefit of U.S. Provisional Application No. 61/034,620, filed on Mar. 7, 2008. The disclosure of the above application is incorporated herein by reference in its entirety.

FIELD

The present disclosure relates to internal combustion engines and more particularly to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate at which fuel is injected to provide a desired air/fuel mixture to the cylinders. Increasing the air and fuel to the cylinders increases the torque output of the engine.

Engine control systems have been developed to control engine torque output to achieve a desired torque. Other vehicle systems, such as a chassis control system, may request that the engine produce torque in excess of torque requested by a driver of the vehicle. For example, the excess torque may be used to eliminate dragging of a wheel of the vehicle, increase vehicle traction, increase vehicle stability, smooth a gear shift, and/or for any other suitable purpose.

SUMMARY

An engine control system of a vehicle comprises a torque module and a chassis request evaluation module. The torque module controls a torque output of an engine based on a driver torque request and selectively increases the torque output based on a chassis torque request. The chassis request evaluation module selectively prevents the increase of the torque output based on at least one of a vehicle speed, a transmission state, and an accelerator pedal position.

In other features, the chassis request evaluation module prevents the increase when the transmission state is one of neutral, park, and reverse.

In still other features, the chassis request evaluation module prevents the increase when the accelerator pedal position is greater than a predetermined position.

In further features, the chassis request evaluation module prevents the increase when the vehicle speed is one of less than a predetermined minimum speed and greater than a predetermined maximum speed.

In still further features, the chassis request evaluation module selectively prevents the increase based on at least one of the vehicle speed, the transmission state, the accelerator pedal position, and a driven wheel speed.

In other features, the chassis request evaluation module prevents the increase when the driven wheel speed is greater than an undriven wheel speed.

In still other features, the chassis request evaluation module selectively prevents the increase based on at least one of the vehicle speed, the transmission state, the accelerator pedal position, and whether a fault is diagnosed in at least one of a sensor and a module of the vehicle.

In further features, the chassis request evaluation module selectively prevents the increase based on at least one of the vehicle speed, the transmission state, the accelerator pedal position, and whether the chassis torque request is greater than a predetermined maximum torque of the engine.

In still further features, the chassis request evaluation module tracks a period from when the torque module exits the increasing to when a second chassis torque request is generated and diagnoses a short request event when the period is less than a predetermined period.

In other features, the chassis request evaluation module disables future increases of the torque output based on future chassis torque requests when a predetermined number of short request events are diagnosed within a second predetermined period.

In still other features, the chassis request evaluation module limits the torque output based on the driver torque request when a vehicle response differs from an expected response a predetermined period after the increase.

In further features, the chassis request evaluation module limits the torque output based on the driver torque request when a wheel drag event continues a predetermined period after the increase.

In still further features, the engine control system further comprises a chassis control module. The chassis control module generates the chassis torque request. The chassis request evaluation module transmits fault data to the chassis control module after at least one of preventing and disabling the increase.

In other features, the torque module increases at least one engine operating parameter based on the chassis torque request.

An engine control method comprises controlling a torque output of an engine based on a driver torque request, selectively increasing the torque output based on a chassis torque request, and selectively preventing the increasing of the torque output based on at least one of a vehicle speed, a transmission state, and an accelerator pedal position.

In other features, the engine control method further comprises preventing the increasing when the transmission state is one of neutral, park, and reverse.

In still other features, the engine control method further comprises preventing the increasing when the accelerator pedal position is greater than a predetermined position.

In further features, the engine control method further comprises preventing the increasing when the vehicle speed is one of less than a predetermined minimum speed and greater than a predetermined maximum speed.

In still further features, the engine control method further comprises selectively preventing the increasing based on at least one of the vehicle speed, the transmission state, the accelerator pedal position, and a driven wheel speed.

In other features, the engine control method further comprises preventing the increasing when the driven wheel speed is greater than an undriven wheel speed.

In still other features, the engine control method further comprises selectively preventing the increasing based on at least one of the vehicle speed, the transmission state, the accelerator pedal position, and whether a fault is diagnosed in at least one of a sensor and a module of the vehicle.

In further features, the engine control method further comprises selectively preventing the increasing based on at least one of the vehicle speed, the transmission state, the accelerator pedal position, and whether the chassis torque request is greater than a predetermined maximum torque of the engine.

In still further features, the engine control method further comprises tracking a period from when the increasing is exited to when a second chassis torque request is generated and diagnosing a short request event when the period is less than a predetermined period.

In other features, the engine control method further comprises disabling future increases of the torque output based on future chassis torque requests when a predetermined number of short request events are diagnosed within a second predetermined period.

In still other features, the engine control method further comprises limiting the torque output based on the driver torque request when a vehicle response differs from an expected response a predetermined period after the increasing has begun.

In further features, the engine control method further comprises limiting the torque output based on the driver torque request when a wheel drag event continues a predetermined period after the increasing has begun.

In still further features, the engine control method further comprises generating the chassis torque request using a chassis control module and transmitting fault data to the chassis control module after at least one of preventing and disabling the increasing.

In other features, the increasing the torque output of said engine comprises increasing at least one engine operating parameter based on the chassis torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
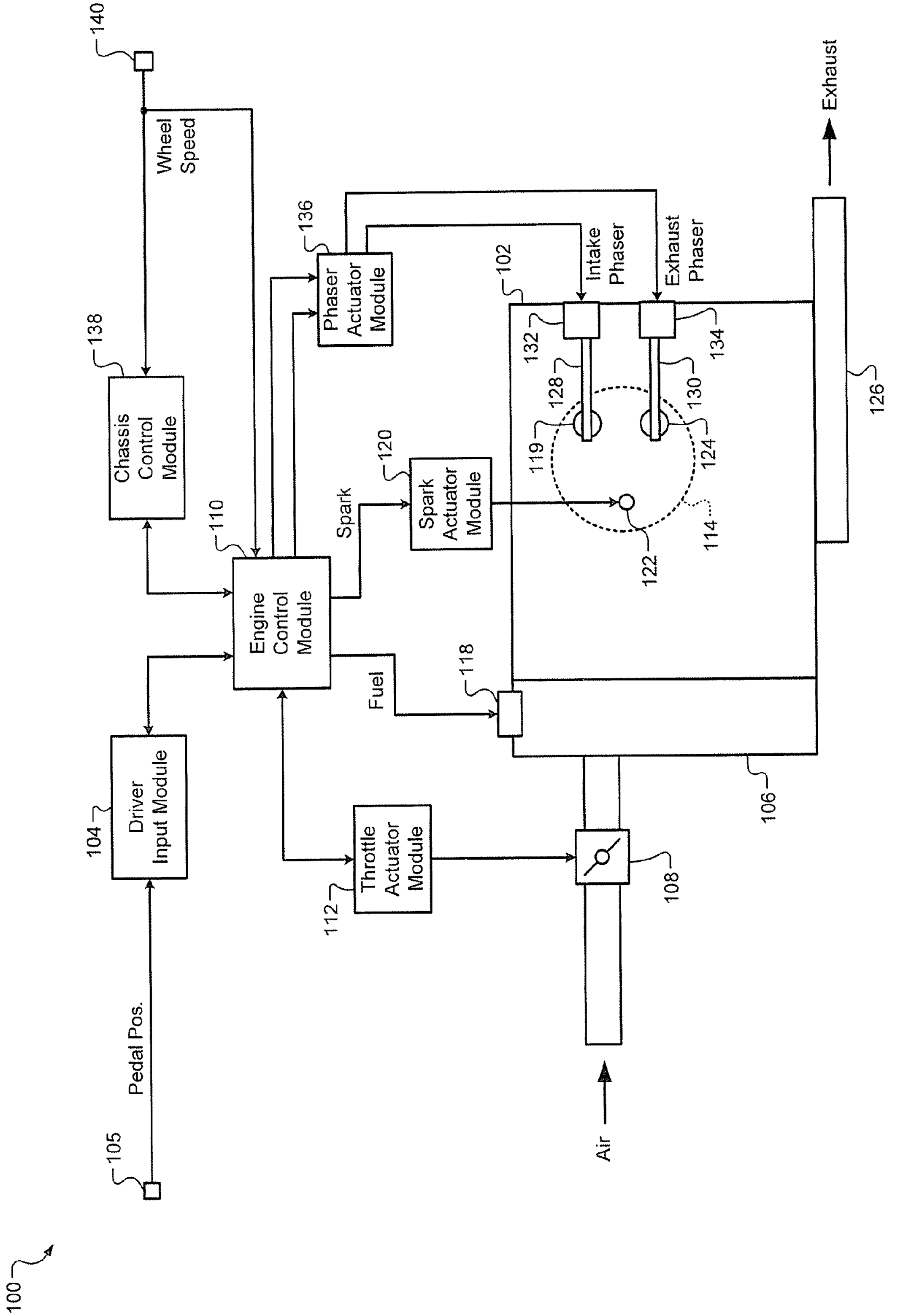
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller generally controls torque output by an engine based on torque requested by a driver of a vehicle (i.e., a driver torque request). In some circumstances, the engine controller may adjust the torque output of the engine to greater than the driver torque request. For example, the engine controller may increase the torque output of the engine when a chassis torque request is generated that is greater than the driver torque request. The chassis torque request may be generated to, for example, increase the torque output of the engine and eliminate wheel drag.

The engine controller of the present disclosure selectively prevents an increase in the torque output of the engine for a chassis torque request based on various parameters. For example only, the engine controller prevents increasing the torque output when the transmission is in neutral, park, or reverse, when the accelerator pedal position is greater than a predetermined position, and/or when the vehicle speed is outside a predetermined range of speeds. The engine controller may also prevent increasing the torque output when a driven wheel stops dragging and/or when a fault has been diagnosed in a sensor or module of the vehicle. Increasing the torque output of the engine under such circumstances may be, for example, unnecessary and/or futile.

Referring now to FIG. 1, a functional block diagram of an engine system 100 is presented. The engine system 100 includes an engine 102 that combusts an air/fuel mixture to produce drive torque for a vehicle based on driver inputs provided by a driver input module 104. While a spark ignition, gasoline-type engine is described herein, the present disclosure is applicable to other types of torque producers, not limited to gasoline-type engines, diesel-type engines, fuel cell engines, propane engines, and hybrid-type engines implementing one or more electric motors. The driver input module 104 receives the driver inputs from, for example, a pedal position sensor 105 that monitors position of an accelerator pedal (not shown) and generates a pedal position signal accordingly.

Air is drawn into an intake manifold 106 through a throttle valve 108. An engine control module (ECM) 110 commands a throttle actuator module 112 to regulate opening of the throttle valve 108 to control the amount of air drawn into the intake manifold 106. Air from the intake manifold 106 is drawn into cylinders of the engine 102. While the engine 102 may include multiple cylinders, for illustration purposes only, a single representative cylinder 114 is shown. For example only, the engine 102 may include 2, 3, 4, 5, 6, 8, 10, and/or 12 cylinders.

The air mixes with fuel provided by a fuel actuator 118 (e.g., a fuel injector) to form the air/fuel mixture, which is combusted within the cylinders. The ECM 110 controls the amount of fuel injected by the fuel actuator 118. The fuel actuator 118 may inject fuel into the intake manifold 106 at a central location or at multiple locations, such as near the intake valve of each of the cylinders. While the fuel actuator

118 is shown as injecting fuel into the intake manifold 106, the fuel actuator 118 may inject fuel at any suitable location, such as directly into the cylinder 114. For example only, one fuel actuator may be provided for each of the cylinders.

The injected fuel mixes with the air and creates the air/fuel mixture. The air or the air/fuel mixture is drawn into the cylinder 114 through an associated intake valve 119. A piston (not shown) within the cylinder 114 compresses the air/fuel mixture. Based upon a signal from the ECM 110, a spark actuator module 120 energizes a spark plug 122 that is associated with the cylinder 114, which ignites the air/fuel mixture. The timing of the spark may be specified relative to the time at which the piston is at its topmost position, referred to as to top dead center (TDC), the point at which the air/fuel mixture is most compressed. In other engine systems, such as a compression combustion type engine (e.g., a diesel engine system) or a hybrid engine system, combustion may be initiated without the spark plug 122.

The combustion of the air/fuel mixture drives the piston down, thereby rotatably driving crankshaft (not shown). The piston later begins moving up again and expels the byproducts of combustion through an exhaust valve 124. The byproducts of combustion are exhausted from the vehicle via an exhaust system 126.

The intake valve 119 may be controlled by an intake camshaft 128, while the exhaust valve 124 may be controlled by an exhaust camshaft 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 119 is opened may be varied with respect to piston TDC by an intake cam phaser 132. The time at which the exhaust valve 124 is opened may be varied with respect to piston TDC by an exhaust cam phaser 134. A phaser actuator module 136 controls the intake cam phaser 132 and the exhaust cam phaser 134 based on signals from the ECM 110.

To abstractly refer to the various control mechanisms of the engine 102, each system that varies an engine parameter may be referred to as an actuator. For example, the throttle actuator module 112 controls the opening area of the throttle valve 108. The throttle actuator module 112 is therefore referred to as an actuator, and the opening area of the throttle valve 108 is referred to as an actuator position.

Similarly, the spark actuator module 120 can be referred to as an actuator, while the corresponding actuator position may refer to the timing of the spark. Other actuators include, for example, the phaser actuator module 136 and the fuel actuator 118. The term actuator position with respect to these actuators may correspond to cam phaser angles (i.e., intake and exhaust) and amount of fuel injected, respectively.

The ECM 110 adjusts the actuator positions to regulate torque produced by the engine 102 and provide a desired torque output. Torque is output by the engine 102 to a transmission (not shown). The transmission selectively transfers torque to one or more wheels of the vehicle to propel the vehicle. A wheel to which torque is transferred is referred to as a driven wheel, while a wheel that is not being provided with torque is referred to as an undriven wheel.

The ECM 110 may adjust the torque output by the engine 102 based on torque and/or speed requested by the driver of the vehicle (i.e., a driver torque request). A chassis control system (not shown) and/or other vehicle systems may also make torque requests. A chassis control module 138 monitors the chassis control system and selectively transmits a chassis torque request to the ECM 110.

For example, the chassis control module 138 may monitor rotational speed of the wheels of the vehicle. The rotational speed of one of the wheels is referred to as a wheel speed. Wheel speed may be measured by a wheel speed sensor 140. While only the wheel speed sensor 140 is shown, the engine system 100 may include more than one wheel speed sensor for each of the wheels. The wheel speeds are provided to the chassis control module 138 and the ECM 110.

The chassis control module 138 may generate the chassis torque request based on, for example, vehicle traction, wheel drag, and/or vehicle stability control. For example, wheel drag may occur when the wheel speed of a driven wheel of the vehicle is less than the wheel speed of an undriven wheel and/or when the undriven wheel speed is approximately a predetermined speed, such as zero. The chassis control module 138 selectively generates a chassis torque request when wheel drag occurs. The chassis control module 138 generates such a chassis torque request to increase torque production of the engine 102 above the driver torque request. The increased torque eliminates the wheel drag and causes (or allows) the dragging wheel to begin rolling.

Figure 2:
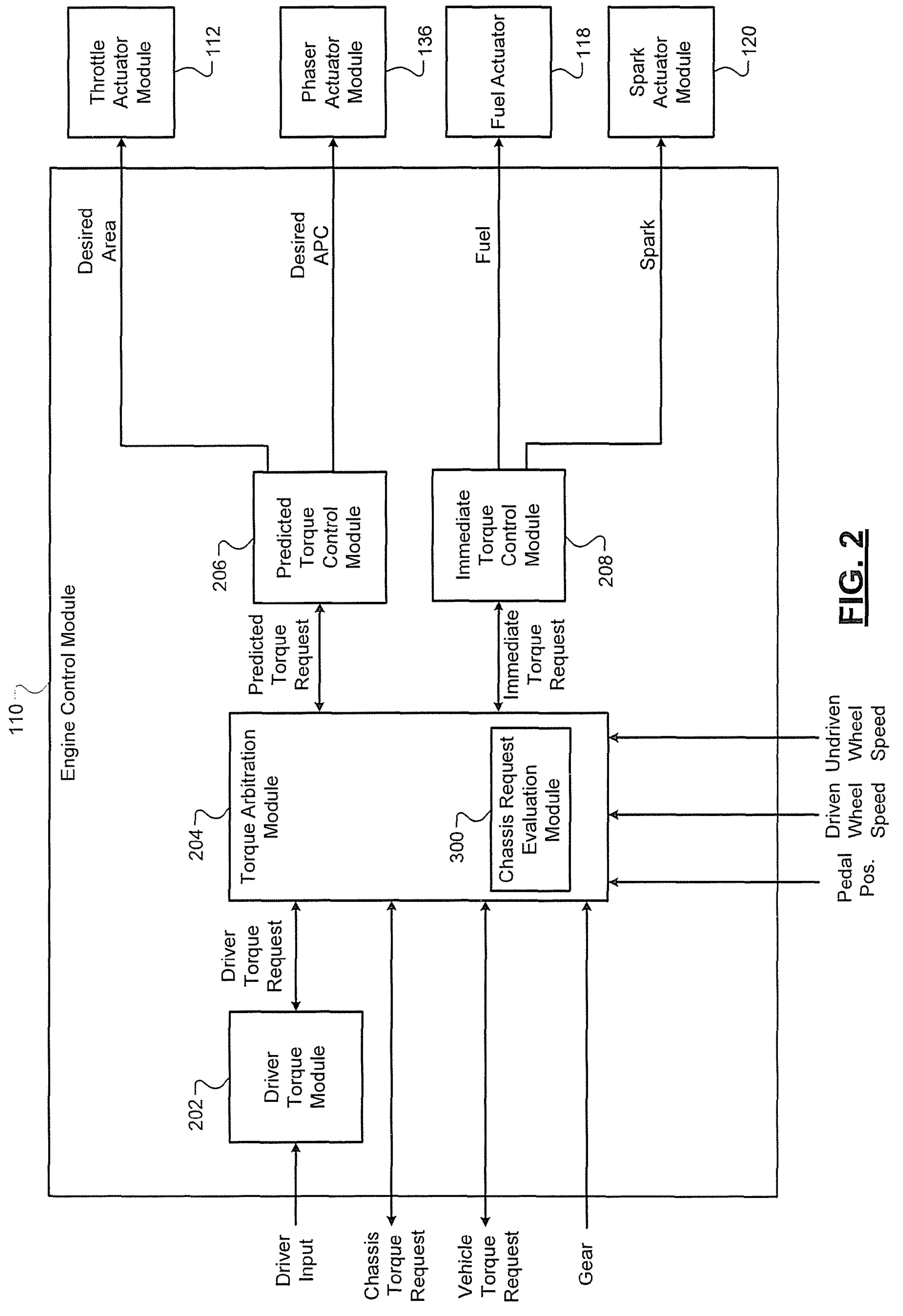
FIG. 2 is a functional block diagram of an exemplary implementation of an engine control module according to the principles of the present disclosure.

Referring now to FIG. 2, a functional block diagram of an exemplary implementation of the ECM 110 is presented. The ECM 110 includes a driver torque module 202, a torque arbitration module 204, a predicted torque control module 206, and an immediate torque control module 208. The driver torque module 202 generates a driver torque request based on a driver input provided by the driver input module 104. For example, the driver input may be based on the position of the accelerator pedal.

The torque arbitration module 204 arbitrates between the driver torque request, the chassis torque request, and other torque requests. The other torque requests are collectively referred to as vehicle torque requests. For example only, the vehicle torque requests may include a transmission torque request, a hybrid engine torque request, and/or other suitable torque requests. A transmission torque request may be generated to, for example, coordinate the engine speed with the transmission input speed to accomplish a gear shift. A hybrid engine torque request may be generated to, for example, coordinate operation of the engine 102 and an electric motor (not shown).

The torque arbitration module 204 also validates the torque requests before arbitration. For example, the torque arbitration module 204 may employ any suitable validation technique, such as a two's compliment check (e.g., a checksum), an alive rolling counter check, and/or a missing message check. The torque arbitration module 204 determines a predicted torque request and an immediate torque request based on the validated torque requests. More specifically, the torque arbitration module 204 determines how best to achieve the torque requests and generates the predicted and immediate torque requests accordingly.

The predicted torque request is the amount of torque that will be required in the future to meet the driver torque request and/or the driver's speed requests. The immediate torque request is the amount of torque required at the present moment to meet temporary torque requests. The immediate torque request may be achieved using engine actuators that respond quickly, while slower engine actuators may be targeted to achieve the predicted torque request.

For example, the timing of the spark provided by the spark plug 122 and the amount of fuel injected by the fuel actuator 118 may be adjusted in a short period of time. Accordingly, the spark timing and/or the amount of fuel may be adjusted to provide the immediate torque request. The cam phaser positions and the opening of the throttle valve 108 may require a longer period of time to be adjusted. Accordingly, the throttle actuator module 112 and/or the phaser actuator module 136 may be targeted to meet the predicted torque request.

The torque arbitration module 204 outputs the predicted torque request to the predicted torque control module 206 and the immediate torque request to the immediate torque control module 208. The predicted torque control module 206 determines desired actuator positions for slow actuators based on the predicted torque request. The slow actuators may include, for example, the throttle actuator module 112 and/or the phaser actuator module 136. For example only, the predicted torque control module 206 may determine the desired actuator positions to create a desired manifold absolute pressure (MAP), desired throttle area, and/or desired air per cylinder (APC). The slow actuators then actuate based on the desired actuator positions.

For example, the predicted torque control module 206 generates a desired area signal, which is output to the throttle actuator module 112. The throttle actuator module 112 then regulates the throttle valve 108 to produce the desired throttle area. The predicted torque control module 206 may also generate a desired air per cylinder (APC) signal, which is output to the phaser actuator module 136. The phaser actuator module 136 may then command the intake and/or exhaust cam phasers 132 and 134 to adjust timing of the intake and/or exhaust valves 119 and 124, respectively, to produce the desired APC.

The immediate torque control module 208 determines desired actuator positions for fast actuators based on the immediate torque request. The fast actuators may include, for example, the spark actuator module 120 and/or the fuel actuator 118. For example only, the immediate torque control module 208 may instruct the spark timing to a calibrated timing, such as a minimum best torque (MBT) timing. The MBT spark timing may refer to the minimum spark advance possible (relative to a predetermined timing) at which a maximum amount of torque may be produced. The fast actuators actuate based on these desired actuator positions.

The torque arbitration module 204 includes a chassis request evaluation module 300 that selectively adjusts the predicted and immediate torque requests based on the chassis torque request. The chassis request evaluation module 300 evaluates the chassis torque request and verifies that the condition for which the chassis torque request is made is occurring (or acceptable). The chassis request evaluation module 300 may also verify that the chassis torque request is appropriate for the vehicle parameters and for the state of various components of the engine system 100.

Once verified, the chassis request evaluation module 300 adjusts the predicted and immediate torque requests based on the chassis torque request for a predetermined period of time. After that period of time, the chassis request evaluation module 300 compares the vehicle response with an expected vehicle response. The chassis request evaluation module 300 may disable adjusting the predicted and/or immediate torque request based on the chassis torque request if the expected vehicle response does not occur. Otherwise, the chassis request evaluation module 300 may selectively limit the torque requests to the driver torque request and/or an expected drag request. The chassis request evaluation module 300 also provides data to the chassis control system regarding the status of the chassis torque request. Such data may prevent the chassis control system from generating another chassis torque request of a greater magnitude, which is referred to as wind up.

Figure 3:
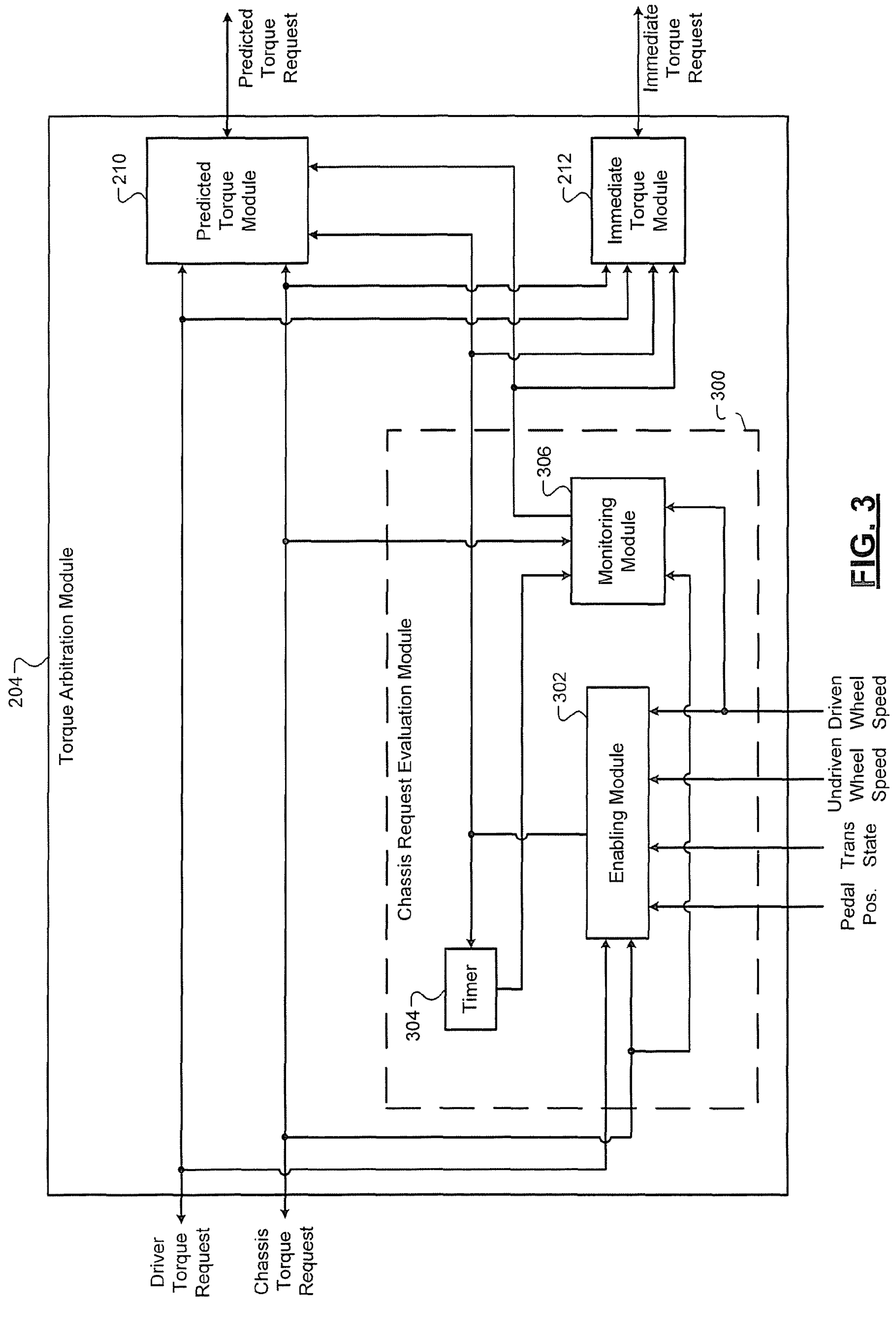
FIG. 3 is a functional block diagram of an exemplary implementation of a chassis request evaluation module according to the principles of the present disclosure.

Referring now to FIG. 3, a functional block diagram of an exemplary implementation of the chassis request evaluation module 300 is presented. While the chassis request evaluation module 300 is shown as located within the torque arbitration module 204, the chassis request evaluation module 300 may be located in any suitable location and may be external to the torque arbitration module 204.

The torque arbitration module 204 includes a predicted torque module 210 and an immediate torque module 212. The predicted and immediate torque modules 210 and 212 each receive the driver torque request and generate the predicted and immediate torque requests, respectively, based on the driver torque request.

The predicted torque module 210 and/or the immediate torque module 212 may also adjust the predicted torque request based on the chassis torque request. While the chassis torque request may be a request to decrease torque, the present disclosure relates to chassis torque requests to increase torque output of the engine 102. More specifically, the present disclosure relates to chassis torque requests to increase the torque output of the engine 102 above the driver torque request.

In some circumstances, a driven wheel of the vehicle may momentarily lock up and drag. The chassis control module 138 may generate a chassis torque request to increase torque provided to one or more wheels and eliminate such dragging. A chassis torque request that is generated to eliminate a wheel drag event is referred to as a drag request. While the present disclosure will be discussed as they relate to drag requests, the present disclosure is also applicable to other chassis torque requests to increase torque above the driver torque request, such as chassis torque requests for vehicle stability and/or traction control.

The chassis request evaluation module 300 includes an enabling module 302, a timer 304, and a monitoring module 306. The enabling module 302 instructs the predicted and immediate torque modules 210 and 212 to adjust the predicted and immediate torque requests, respectively, based on the drag request when predetermined enabling conditions are satisfied. For example only, the enabling conditions may be based on the driver torque request, the drag request, the pedal position signal, the operational state of the transmission, and/or the speeds of driven and undriven wheels.

More specifically, the enabling module 302 may instruct adjustment of the predicted and immediate torque requests based on the drag request when the drag request is greater than the driver torque request. The enabling module 302 may, however, instruct the predicted and immediate torque modules 210 and 212 to refrain from adjusting the predicted and immediate torque requests when wheel drag is not occurring. In other words, the enabling module 302 prevents adjustment of the predicted and immediate torque requests based on the drag request when wheel drag is not occurring.

For example only, wheel drag may be occurring when the wheel speed of the driven wheel is less than a predetermined speed and/or when the undriven wheel speed is greater than the driven wheel speed by more than a predetermined amount. If wheel drag is not occurring, the drag request is likely unnecessary.

The enabling module 302 may also instruct the predicted and immediate torque modules 210 and 212 to refrain from adjusting the predicted and immediate torque requests when the transmission is in a predetermined state, such as neutral, park, or reverse. In other words, the enabling module 302 prevents adjustment of the predicted and immediate torque requests based on the drag request when the transmission is in neutral, park, or reverse. In such a state, a drag request is likely not valid.

The enabling module 302 may also determine whether the engine system 100 is capable of meeting the drag request and instruct the predicted and immediate torque modules 210 and 212 to refrain from adjusting the predicted and immediate torque requests when the engine system 100 is incapable. In other words, the enabling module 302 prevents adjustment of the predicted and immediate torque requests based on the drag request when the chassis torque request exceeds the torque capabilities of the engine system 100. A drag request in excess of the capabilities of the engine system 100 indicates that the drag request is likely invalid.

Additionally, the enabling module 302 may also instruct the predicted and immediate torque modules 210 and 212 to refrain from adjusting the predicted and immediate torque requests when a fault or error has been diagnosed for a vehicle component. In other words, the enabling module 302 prevents adjustment of the predicted and immediate torque requests based on the drag request when a fault or error has been diagnosed. For example, an error or fault may be diagnosed in the wheel speed sensor 140, the chassis control module 138, and/or other vehicle modules or systems. An error may occur when, for example, a value generated by the component is out of range, or out of correlation with an expected value. A fault may occur when at least a predetermined number of errors occur over a predetermined period of time.

The enabling module 302 may also selectively instruct the predicted and immediate torque modules 210 and 212 to refrain from adjusting the predicted and immediate torque requests based on various parameters. For example only, the enabling module 302 may instruct the predicted and immediate torque modules 210 and 212 to refrain from adjusting the predicted and immediate torque requests when the position of the accelerator pedal is greater than a predetermined position, such as 70%. In other words, the enabling module 302 prevents adjustment of the predicted and immediate torque requests based on the drag request when accelerator pedal position is greater than the predetermined position.

The enabling module 302 may also instruct the predicted and immediate torque modules 210 and 212 to refrain from adjusting the predicted and immediate torque requests when the vehicle speed is outside a predetermined window of speeds. In other words, the enabling module 302 prevents adjustment of the predicted and immediate torque requests based on the drag request when the vehicle speed is outside the predetermined window.

The enabling module 302 generates an enable signal to enable adjustment of the predicted and immediate torque requests based on the drag request. The predicted and immediate torque modules 210 and 212 then adjust the predicted and immediate torque requests, respectively. In other words, the predicted and immediate torque modules 210 and 212 increase the torque output of the engine 102 based on the drag request.

The enabling signal is also transmitted to the timer 304, and the timer 304 activates when the enable signal is generated. The timer 304 may also be set to a predetermined reset value, such as zero, when the enable signal is generated. The timer 304 tracks the period of time elapsed since the enabling conditions were satisfied (i.e., when adjustment based on the drag request was enabled).

The monitoring module 306 monitors the timer 304 and instructs the predicted and immediate torque modules 210 and 212 to adjust the respective torque requests based on the drag request during a predetermined period. This period of time is measured from the time when adjustment based on the drag request is enabled. This period of time may be referred to as a blip time, may be calibratable, and may set to a predetermined value, such as 250.0 ms. Accordingly, the predicted and immediate torque modules 210 and 212 adjust the respective torque requests based on the drag request during the blip time. In this manner, the actuators are adjusted to increase the torque output of the engine 102 based on the drag request during the blip time.

The monitoring module 306 also diagnoses occurrence of short drag request events. For example only, a short drag request event may occur when, during a predetermined period of time, the chassis control module 138 generates a first drag request, stops generating the first drag request, and generates a second drag request. This predetermined period of time may be calibratable and may be set to, for example, 200.0 ms.

A counter (not shown) may be incremented each time a short drag request event is diagnosed. The monitoring module 306 instructs the predicted and immediate torque modules 210 and 212 to stop adjusting the respective torque requests based on the drag request when a predetermined number of short drag request events (e.g., three) occur during a predetermined period of time (e.g., 1.0 s). Additionally, the monitoring module 306 may instruct the predicted and immediate torque modules 210 and 212 to refrain from adjusting the respective torque requests based on future drag requests. The predicted and immediate torque modules 210 and 212 then adjust the predicted and immediate torque requests, respectively, based on the driver torque request.

The monitoring module 306 monitors the vehicle response and selectively adjusts the predicted and immediate torque requests accordingly. More specifically, the monitoring module 306 compares the vehicle response with an expected response. For example, for the drag request, the expected response may be that wheel drag stops, as the drag request was generated to stop the dragging of the driven wheel.

If the wheel drag has stopped, the monitoring module 306 monitors the drag request and may limit or disable adjustments for the drag request. The monitoring module 310 may also instruct the predicted and immediate torque modules 210 and 212 to refrain from adjusting the respective torque requests based on future drag requests until the chassis control system clears (i.e., stops requesting) the drag request. When the blip time ends, the monitoring module 306 may limit the torque requests based on the driver requested torque. For example only, the monitoring module 306 may limit the torque requests to a predetermined amount of torque or percentage greater than the driver torque request, such as 10.0 Nm.

If wheel drag is still occurring after the passing of the blip time, the monitoring module 306 may instruct the predicted and immediate torque modules 210 and 212 to limit the respective torque requests based on the driver torque request. For example only, the predicted and immediate torque modules 210 and 212 may then limit the respective torque requests to a predetermined amount of torque greater than the driver torque request, such as approximately 10.0 Nm.

The monitoring module 306 also compares the drag request to an expected drag request after the passing of the blip time. For example, an increase in torque production (e.g., 10 Nm) for at least a predetermined period of time (e.g., 1000 ms) may be expected for a given drag request. The monitoring module 306 instructs the predicted and immediate torque modules 210 and 212 to adjust the respective torque requests based on the expected drag request when the drag request deviates from the expected drag request by more than a predetermined amount or percentage. Such a limitation may be imposed to, for example, prevent unnecessary vehicle acceleration.

Figure 4:
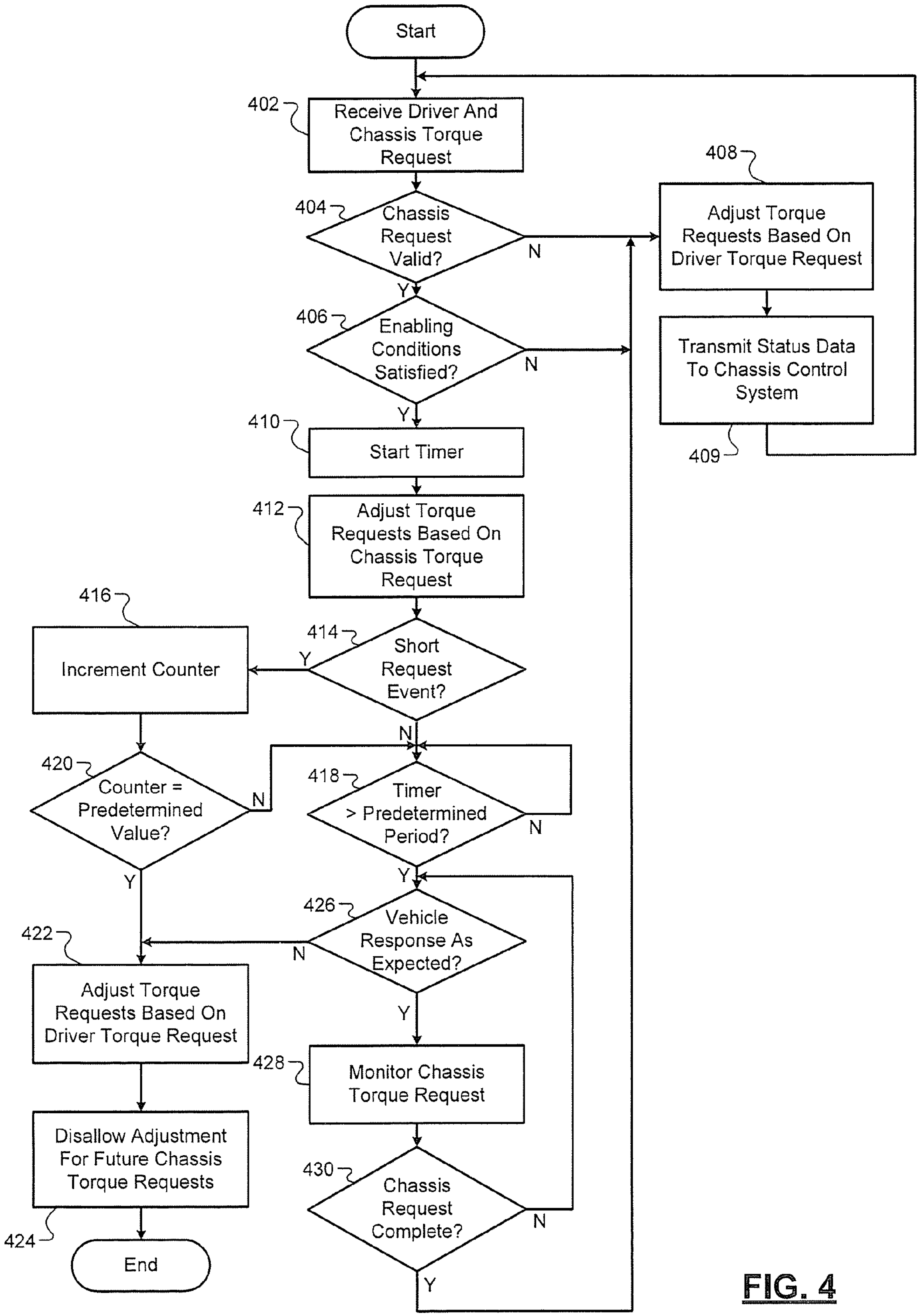
FIG. 4 is a flowchart depicting exemplary steps performed by the chassis request evaluation module according to the principles of the present disclosure.

Referring now to FIG. 4, a flowchart depicting exemplary steps performed by the chassis request evaluation module 300 is presented. Control begins in step 402 where control receives the driver torque request and the chassis torque request. More specifically, the chassis torque request is a drag request (i.e., a torque request to increase torque production above the driver torque request to eliminate wheel dragging).

Control continues in step 404 where control determines whether the drag request is valid. If true, control continues to step 406; otherwise, control transfers to step 408. For example only, control may validate the drag request using any suitable technique, such as the two's complement check, the alive rolling error counter check, and/or the missing messages check.

Control continues in step 406 where control determines whether the enabling conditions have been satisfied. If true, control continues to step 410; otherwise, control transfers to step 408. For example only, the enabling conditions may be satisfied when: the drag request is greater than the driver torque request; wheel drag is occurring; the transmission not in park, neutral, or reverse; the engine system 100 is capable of meeting the drag request; a fault or error has not been diagnosed for a vehicle component; the position of the accelerator pedal is less than a predetermined position; and the vehicle speed is within a predetermined speed window.

In step 408, control adjusts the predicted and immediate torque requests based on the driver torque request. In this manner, control adjusts the actuators based on the driver torque request when the drag request is invalid or when the enabling conditions are not satisfied. After step 408, control returns to step 402. Control may also provide data regarding status of the chassis torque request (i.e., whether torque request adjustment occurred) and/or range data to the chassis control system in step 409 before returning to step 402.

In step 410 (i.e., if the drag request is valid and the enabling conditions are satisfied), control starts the timer. The timer tracks the time elapsed since a valid drag request meeting the enabling conditions was received. Control continues in step 412 where control adjusts the predicted and immediate torque requests based on the drag request. More specifically, control adjusts the engine actuators, and, therefore, the torque output of the engine 102 based on the drag request.

Control then continues in step 414 where control determines whether a short drag request event has occurred. If true, control transfers to step 416; otherwise, control continues to step 418. For example only, a short drag request may occur when, within a predetermined period of time (e.g., 200.0 ms), a first drag request is generated, the first drag request ends, and a second drag request is generated. When a short drag request event has occurred, control increments a counter in step 416. In step 420, control determines whether the counter is equal to a predetermined value (e.g., three). If true, control continues in step 422; otherwise, control transfers to step 418.

In step 422, control adjusts the predicted and immediate torque requests based on the driver torque request. In this manner, control disables adjustment of the torque requests based on the drag request and adjusts torque output of the engine 102 based on the driver torque request. Control continues in step 424 where control disallows actuator adjustment based on future chassis torque requests, and control ends. In this manner, if a predetermined number of short drag request events occur within a predetermined period of time, such as 1.0 s, control disallows adjustment based on future chassis torque requests, as the future requests will likely also be faulty.

Referring back to step 418, control determines whether the timer is greater than or equal to a predetermined period. If true, control continues to step 426; otherwise, control remains in step 418. This period of time may be referred to as the blip time, may be calibratable, and may be set to, for example, 250.0 ms.

In step 426, control monitors the vehicle response and determines whether the vehicle response is as expected. For the drag request, control determines whether the driven wheel is still dragging in step 426. If true, control continues in step 428; otherwise, control transfers to step 422. In this manner, when the wheel dragging is not remedied, control adjusts the predicted and immediate torque requests based on the driver torque request to prevent unnecessary vehicle acceleration.

In step 428, control monitors the drag request. In step 428, control also limits the drag request. For example, control may limit the torque requests when the drag request deviates from the expected drag request by more than a predetermined amount or percentage. In step 430, control determines whether the drag request is complete. If true, control returns to step 408 to adjust the actuators based on the driver torque request; otherwise, control returns to step 426.

Figure 5:
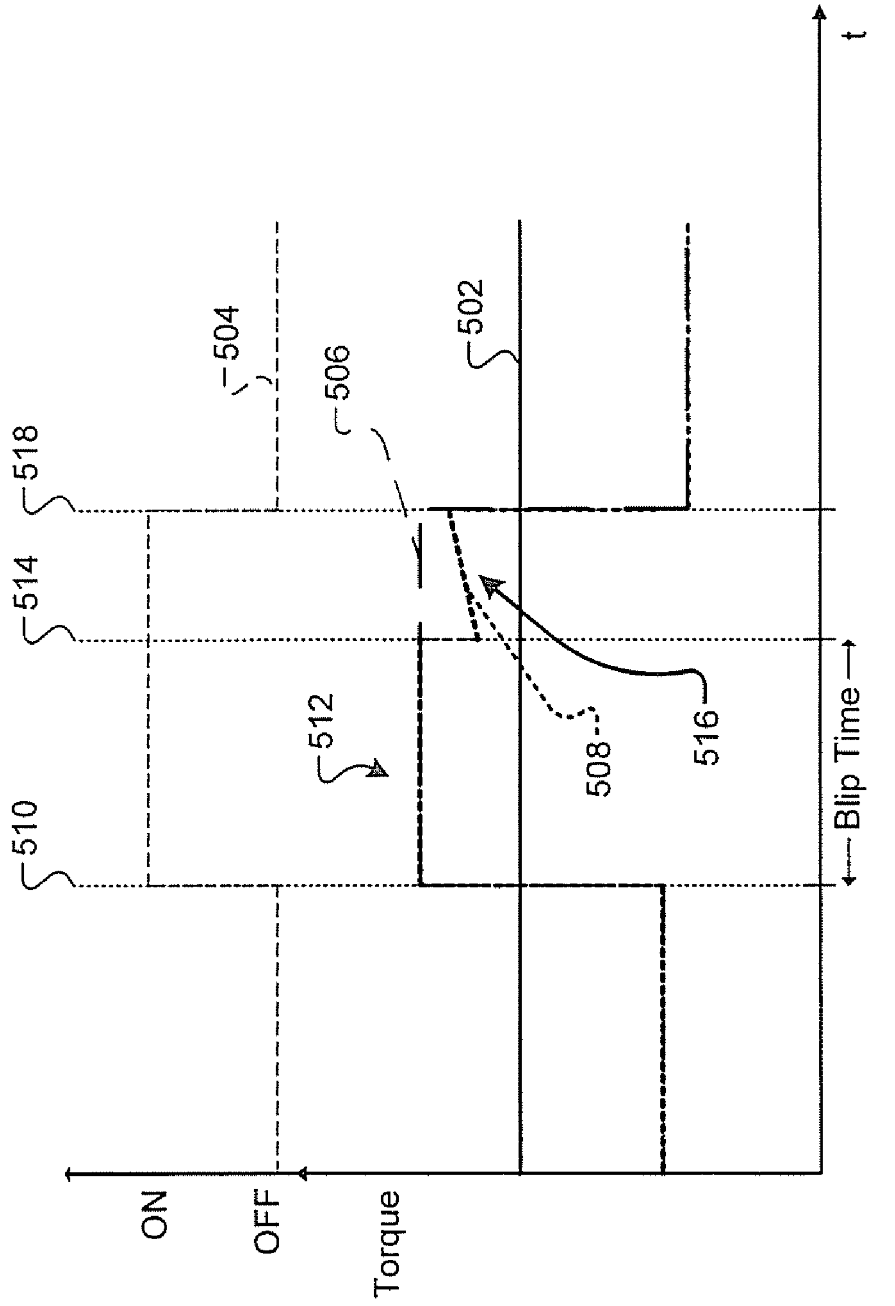
FIG. 5 is an exemplary graphical illustration of operation of the chassis request evaluation module according to the principles of the present disclosure.

Referring now to FIG. 5, an exemplary graphical illustration of the operation of the chassis request evaluation module 300 is presented. Solid line 502 represents an exemplary driver torque request. For purposes of illustration only, the driver torque request 502 is depicted as being constant. Dashed line 504 represents the state of the drag request, such as active (e.g., ON) or inactive (e.g., OFF). Dashed line 506 represents an exemplary drag request and dashed line 508 represents the torque requests (i.e., predicted and immediate torque requests).

The chassis control module 138 generates the drag request 506 at time 510, as shown by dashed line 504. More specifically, the chassis control module 138 requests an increase in torque production above the driver torque request 502 to, for example, eliminate wheel drag. The chassis request evaluation module 300 adjusts the torque requests 508 based on the drag request 506 for a predetermined period of time as shown at 512. In this manner, the actuators are adjusted based on the drag request 506 during the period of time and the torque output by the engine 102 is increased is above the driver torque request 502. This period of time (i.e., between times 510 and 514) is referred to as the blip time. At time 514, the blip time ends.

At time 514, the chassis request evaluation module 300 limits the torque requests 508 as shown at 516. For example only, the chassis request evaluation module 300 limits the torque requests 508 to a predetermined torque amount or percentage greater than the driver torque request 502. The chassis request evaluation module 300 monitors the drag request 506 and limits the torque requests 508 based on the expected drag request. The drag request 506 ends at time 518. When the drag request 506 ends, the torque requests 508 are adjusted based on the driver torque request 502.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system of a vehicle, comprising:

a torque module that controls a torque output of an engine based on a driver torque request and that selectively increases said torque output based on a chassis torque request; and a chassis request evaluation module that selectively prevents said increase of said torque output based on at least one of a vehicle speed, a transmission state, and an accelerator pedal position.

2. The engine control system of claim 1 wherein said chassis request evaluation module prevents said increase when said transmission state is one of neutral, park, and reverse.

3. The engine control system of claim 1 wherein said chassis request evaluation module prevents said increase when said accelerator pedal position is greater than a predetermined position.

4. The engine control system of claim 1 wherein said chassis request evaluation module prevents said increase when said vehicle speed is one of less than a predetermined minimum speed and greater than a predetermined maximum speed.

5. The engine control system of claim 1 wherein said chassis request evaluation module selectively prevents said increase based on at least one of said vehicle speed, said transmission state, said accelerator pedal position, and a driven wheel speed.

6. The engine control system of claim 5 wherein said chassis request evaluation module prevents said increase when said driven wheel speed is greater than an undriven wheel speed.

7. The engine control system of claim 1 wherein said chassis request evaluation module selectively prevents said increase based on at least one of said vehicle speed, said transmission state, said accelerator pedal position, and whether a fault is diagnosed in at least one of a sensor and a module of said vehicle.

8. The engine control system of claim 1 wherein said chassis request evaluation module selectively prevents said increase based on at least one of said vehicle speed, said transmission state, said accelerator pedal position, and whether said chassis torque request is greater than a predetermined maximum torque of said engine.

9. The engine control system of claim 1 wherein said chassis request evaluation module tracks a period from when said torque module exits said increasing to when a second chassis torque request is generated and diagnoses a short request event when said period is less than a predetermined period.

10. The engine control system of claim 9 wherein said chassis request evaluation module disables future increases of said torque output based on future chassis torque requests when a predetermined number of short request events are diagnosed within a second predetermined period.

11. The engine control system of claim 1 wherein said chassis request evaluation module limits said torque output based on said driver torque request when a vehicle response differs from an expected response a predetermined period after said increase.

12. The engine control system of claim 1 wherein said chassis request evaluation module limits said torque output based on said driver torque request when a wheel drag event continues a predetermined period after said increase.

13. The engine control system of claim 1 further comprising a chassis control module that generates said chassis torque request, wherein said chassis request evaluation module transmits fault data to said chassis control module after at least one of preventing and disabling said increase.

14. The engine control system of claim 1 wherein said torque module increases at least one engine operating parameter based on said chassis torque request.

15. An engine control method comprising:

controlling a torque output of an engine based on a driver torque request;

selectively increasing said torque output based on a chassis torque request; and selectively preventing said increasing of said torque output based on at least one of a vehicle speed, a transmission state, and an accelerator pedal position.

16. The engine control method of claim 15 further comprising preventing said increasing when said transmission state is one of neutral, park, and reverse.

17. The engine control method of claim 15 further comprising preventing said increasing when said accelerator pedal position is greater than a predetermined position.

18. The engine control method of claim 15 further comprising preventing said increasing when said vehicle speed is one of less than a predetermined minimum speed and greater than a predetermined maximum speed.

19. The engine control method of claim 15 further comprising selectively preventing said increasing based on at least one of said vehicle speed, said transmission state, said accelerator pedal position, and a driven wheel speed.

20. The engine control method of claim 19 further comprising preventing said increasing when said driven wheel speed is greater than an undriven wheel speed.

21. The engine control method of claim 15 further comprising selectively preventing said increasing based on at least one of said vehicle speed, said transmission state, said accelerator pedal position, and whether a fault is diagnosed in at least one of a sensor and a module of said vehicle.

22. The engine control method of claim 15 further comprising selectively preventing said increasing based on at least one of said vehicle speed, said transmission state, said accelerator pedal position, and whether said chassis torque request is greater than a predetermined maximum torque of said engine.

23. The engine control method of claim 15 further comprising:

tracking a period from when said increasing is exited to when a second chassis torque request is generated; and diagnosing a short request event when said period is less than a predetermined period.

24. The engine control method of claim 23 further comprising disabling future increases of said torque output based on future chassis torque requests when a predetermined number of short request events are diagnosed within a second predetermined period.

25. The engine control method of claim 15 further comprising limiting said torque output based on said driver torque request when a vehicle response differs from an expected response a predetermined period after said increasing has begun.

26. The engine control method of claim 15 further comprising limiting said torque output based on said driver torque request when a wheel drag event continues a predetermined period after said increasing has begun.

27. The engine control method of claim 15 further comprising:

generating said chassis torque request using a chassis control module; and transmitting fault data to said chassis control module after at least one of preventing and disabling said increasing.

28. The engine control method of claim 15 wherein said increasing said torque output of said engine comprises increasing at least one engine operating parameter based on said chassis torque request.

* * * * *